United States Patent
Nakano et al.

(10) Patent No.: US 8,831,866 B2
(45) Date of Patent: Sep. 9, 2014

(54) CONTROL DEVICE TO MINIMIZE DEGRADATION OF FUEL IN A VEHICLE FUEL TANK

(75) Inventors: Yuzo Nakano, Yokohama (JP); Takeshi Aso, Kamakura (JP)

(73) Assignee: Nissan Motor Co., Ltd., Yokohama (JP)

( * ) Notice: Subject to any disclaimer, the term of this patent is extended or adjusted under 35 U.S.C. 154(b) by 8 days.

(21) Appl. No.: 13/816,865

(22) PCT Filed: Aug. 29, 2011

(86) PCT No.: PCT/IB2011/001977
§ 371 (c)(1),
(2), (4) Date: Feb. 13, 2013

(87) PCT Pub. No.: WO2012/038790
PCT Pub. Date: Mar. 29, 2012

(65) Prior Publication Data
US 2013/0144519 A1 Jun. 6, 2013

(51) Int. Cl.
*G06F 19/00* (2011.01)
*B60K 15/00* (2006.01)
*B60K 15/03* (2006.01)

(52) U.S. Cl.
CPC ......... *B60K 15/00* (2013.01); *B60K 2015/0319* (2013.01); *B60K 2015/03197* (2013.01)
USPC ....................................................... 701/123

(58) Field of Classification Search
CPC ..................... B60W 20/1086; B60W 2560/04
USPC ....................................................... 701/123
See application file for complete search history.

(56) References Cited

U.S. PATENT DOCUMENTS

2010/0198438 A1* 8/2010 Iraha et al. .................... 701/22

FOREIGN PATENT DOCUMENTS

| DE | 102008005960 A1 | 7/2009 |
| EP | 1785389 A1 | 5/2007 |
| EP | 1850059 A1 | 10/2007 |
| JP | 2008302772 A | 12/2008 |
| WO | 9928159 A1 | 6/1999 |
| WO | 2009/092473 A1 | 7/2009 |

OTHER PUBLICATIONS

An English translation of the Russian Notice of Allowance for the corresponding Russian patent application No. 2013102880/11(004017) issued on Jun. 17, 2014.

* cited by examiner

*Primary Examiner* — James Trammell
*Assistant Examiner* — Michael D Lang
(74) *Attorney, Agent, or Firm* — Global IP Counselors, LLP

(57) ABSTRACT

A vehicle includes a fuel tank, a fuel amount detecting device and a control device. The fuel amount detecting device is configured to detect an amount of fuel inside the fuel tank. The control device is configured to calculate an estimated refueling amount that diminishes fuel inside the fuel tank from degrading based on a usage history of the vehicle. The control device is further configured such that the control device stops refueling based on an amount of fuel detected by the fuel amount detecting device and the estimated refueling amount.

13 Claims, 13 Drawing Sheets

CONTROL DEVICE TO MINIMIZE DEGRADATION OF FUEL IN A VEHICLE FUEL TANK

CROSS-REFERENCE TO RELATED APPLICATIONS

This application is a U.S. National stage of International Application No. PCT/IB2011/001977, filed Aug. 29, 2011. This application claims priority to Japanese Patent Application No. 2010-213638, filed on Sep. 24, 2010. The entire disclosure of Japanese Patent Application No. 2010-213638 is hereby incorporated herein by reference.

BACKGROUND

1. Field of the Invention

The present invention generally relates to a vehicle. More specifically, the present invention relates to a vehicle with a fuel tank.

2. Background Information

Vehicles are provided with a fuel tank for containing fuel that is supplied to an engine. Fuel in a fuel tank can degrade over a period of time. In hybrid vehicle, an electric motor drives the vehicle and is recharged from an external source. Sometimes the fuel in a fuel tank of hybrid vehicle can remain unused when the electric motor is used extensively. Regarding a hybrid vehicle, there is a known technology for detecting if a fuel inside a fuel tank has degraded and, when degraded fuel is detected, informing a passenger that the fuel has degraded. With the technology disclosed in Japanese Laid-Open Patent Publication No. 2008-302772, informing a passenger that a fuel state is poor can serve as a way to urge the passenger to change the fuel.

SUMMARY

It has been discovered that with the technology disclosed in Japanese Laid-Open Patent Publication No. 2008-302772, it is necessary for degraded fuel inside the fuel tank to be discarded and the passenger must perform the task of discarding the fuel. A consumption rate of fuel in the fuel tank varies according to a capacity of a battery installed in the vehicle and according to a fuel efficiency and electric power consumption efficiency that are determined based mainly on a driving pattern of a driver, an average driving distance of the vehicle, and a condition of an environment in which the vehicle is used. However, in the aforementioned publication, at a time of refueling, the passenger is not notified regarding an amount of fuel that should be put into the tank. Therefore, a passenger needs to discard the degraded fuel and replace it with fresh fuel each time the passenger receives a notification from the vehicle indicating that the fuel is degraded.

The vehicle of the present disclosure was conceived in view of this technical challenge. One object proposed by the present disclosure is to provide a vehicle with which refueling of excess fuel that could become degraded inside the fuel tank can be prevented and a passenger can be relieved of the task of discarding fuel.

In view of the state of the known technology, one aspect of the present disclosure is to provide a vehicle that comprises a fuel tank, a fuel amount detecting device and a control device. The fuel amount detecting device is configured to detect an amount of fuel inside the fuel tank. The control device is configured to calculate an estimated refueling amount that diminishes fuel inside the fuel tank from degrading based on a usage history of the vehicle. The control device is further configured such that the control device stops refueling based on an amount of fuel detected by the fuel amount detecting device and the estimated refueling amount.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
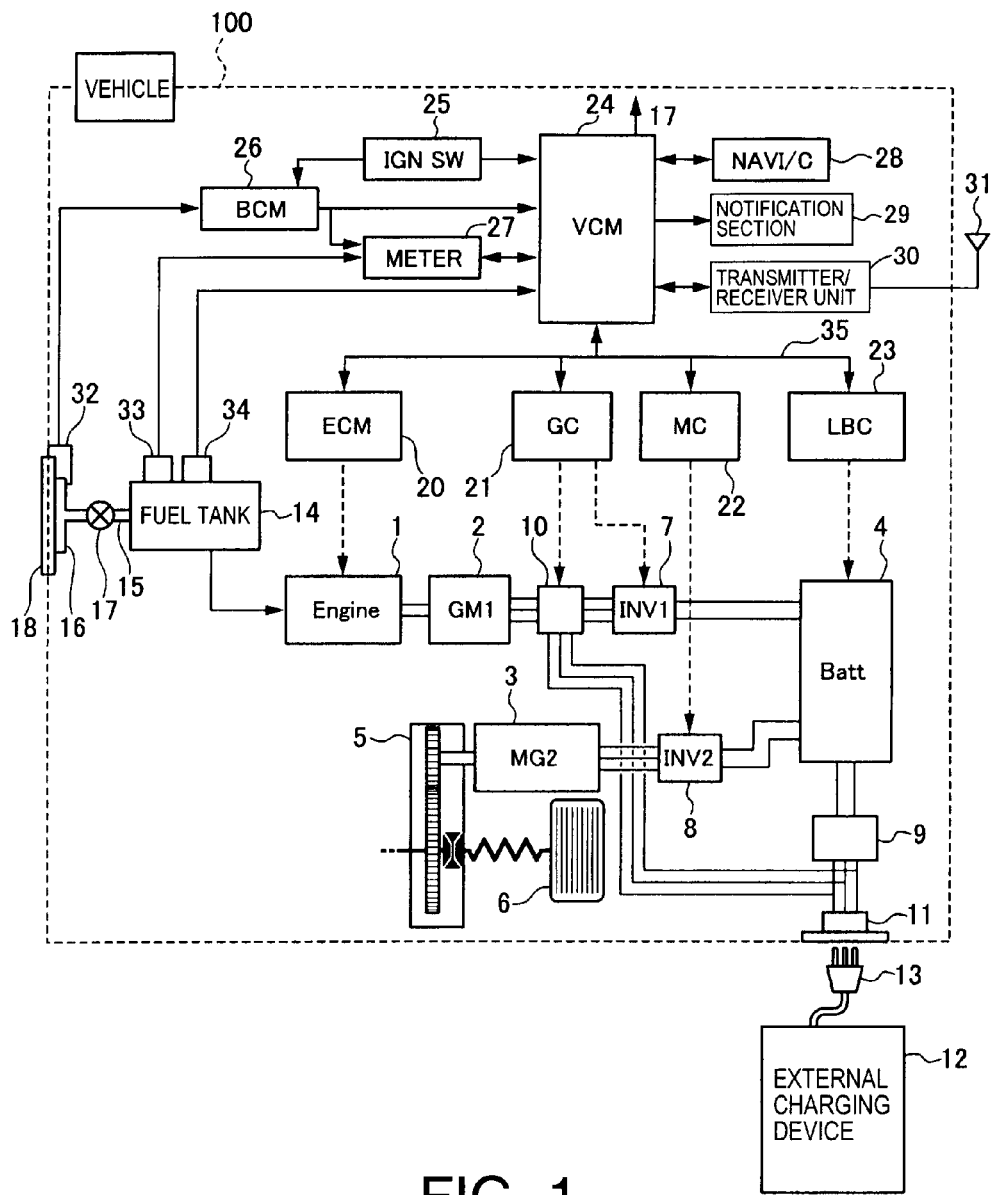
FIG. 1 is a block diagram showing an electric powered vehicle according to one illustrated embodiment.

Referring initially to FIG. 1, a block diagram of an electric powered vehicle 100 is illustrated in accordance with one illustrated embodiment. The electric powered vehicle 100 shown in FIG. 1 is a series-type plug-in hybrid vehicle. However, the invention can be applied to any vehicle having a fuel tank 14, and is not limited to series-type plug-in hybrid vehicle. For example, it is acceptable if the vehicle is a parallel-type plug-in hybrid vehicle or an internal combustion engine vehicle.

The electric powered vehicle 100 shown in FIG. 1 basically an internal combustion engine 1, a generator-motor 2, a drive motor 3, a high-power battery 4, a reduction gear differential mechanism 5, a drive wheel 6, a generator-motor inverter 7 for the motor/generator 2, a drive motor inverter 8 for the drive motor 3, a charging converter 9, a selector device 10, a charging port 11 and a fuel tank 14. As explained below, with the vehicle 100 as described herein, a refueling amount that can substantial prevent degradation of fuel inside the fuel tank is estimated such that refueling can be stopped in accordance with the estimated refueling amount. As a result, refueling of excess fuel that could become degraded inside the fuel tank 14 can be prevented and a passenger can be relieved of the task of discarding fuel from the fuel tank 14.

The vehicle 100 of the illustrated embodiment has an electric vehicle driving mode (hereinafter called "EV mode") and a hybrid vehicle driving mode (hereinafter called "HEV mode"). The EV mode is a mode in which the drive motor 3 is driven with electric power stored in the high-power battery 4 and the vehicle propelled using only the drive motor 3 as a drive source, i.e., the engine 1 does not operate. Meanwhile, the HEV mode is a mode in which the vehicle travels using the drive motor 3 as a drive source and the engine 1 is operated for recharging or other purposes.

The engine 1 is started by the generator-motor 2 when a request for electric power generation occurs. After the engine 2 is running, the engine 2 drives the generator-motor 2, which generates electricity. When the request for electric power generation ends, both the engine 1 and the generator-motor 2 stop.

The generator-motor 2 is connected to the engine 1. The generator-motor 2 includes a motor function and an electric generator function. The motor function of the generator-motor 2 serves to start the engine 1 from a stopped condition by consuming electric power from the high-power battery 4 and continuously cranking the engine 1 until the engine 1 starts. The electric generator function of the generator-motor 2 serves to receive rotational drive power from the engine 1 when the engine 1 is operating in a driving state and convert the rotational drive power into three-phase alternating current electric power, which is used to charge the high-power battery 4.

The drive motor 3 is connected to a drive wheel 6 of the vehicle through a reduction differential mechanism 5. The drive motor 3 includes a motor-generator having a motor function and an electric power generating function. The motor function of the drive motor 3 serves to consume electric power from the high-power battery 4 and drive the vehicle 100 when the vehicle 100 is being accelerated or driving at a steady speed. The electric generator function of the drive motor 3 serves to receive rotational drive power from the drive wheel 6 during deceleration or braking. The electric generator function of the drive motor 3 converts the rotational drive power into three-phase alternating current electric power, which is used to charge the high-power battery 4. Thus, the electric generator function of the drive motor 3 serves to generate electric power in a regenerative fashion.

The high-power battery 4 is a lithium ion secondary battery or a capacitor with a large storage capacity. The high-power battery 4 serves to store electric power generated by the generator-motor 2 and electric power regeneratively generated by the drive motor 3. The high-power battery 4 also serves to supply stored electric power to the drive motor 3 and the generator-motor 2.

The generator-motor inverter 7 is arranged between the generator-motor 2 and the high-power battery 4. The generator-motor inverter 7 serves to convert alternately between three-phase alternating current and direct current. The three-phase alternating current of the generator-motor inverter 7 is used to drive the generator-motor 2 and generate electricity. The direct current of the generator-motor inverter 7 is used to charge and discharge the high-powered battery 4.

The drive motor inverter 8 is arranged between the drive motor 3 and the high-power battery 4. The drive motor inverter 8 serves to convert alternately between three-phase alternating current and direct current. The three-phase alternating current of the drive motor inverter 8 is used to drive the drive motor 3 and generate electricity. The direct current of the drive motor inverter 8 is used to charge and discharge the high-powered battery 4.

The charging converter 9 is arranged between the high-power battery 4 and the charging port 11. The charging converter 9 serves to convert alternating current electric power supplied from an external source via the charging port 11 into direct current electric power that can be used to charge the high-power battery 4 during plug-in charging.

The power path selector device 10 is arranged between the generator-motor 2, the generator-motor inverter 7 and the charging port 11. The power path selector device 10 serves to switch between an electric power generating path and an electric power supply path. When the electric power generating path is selected, the charging port 11 is disconnected and the generator-motor 2 and the generator-motor inverter 7 are connected together. When the electric power supply path is selected, one of the following three power path can be selected. In the first power path, electric power from the high-power battery 4 is used for supplying the electric power. This first power path is accomplished by the charging port 11 being disconnected while the generator-motor 2 and the generator-motor inverter 7 are connected together. In the second power path, electric power from both the charging port 11 and electric power from the high-power battery 4 are used for supplying the electric power. This second power path is accomplished by the generator-motor 2, the generator-motor inverter 7 and the charging port 11 all being connected together. In the third power path, electric power from the charging port 11 is used for supplying the electric power. This third power path is accomplished by the generator-motor inverter 7 is disconnected and the generator-motor 2 and the charging port 11 are connected together such that.

The charging port 11 is arranged on an outer periphery position of the vehicle body. When the vehicle 100 is stopped at a set position of an external charging device 12 and a recharging plug 13 is connected to the charging port 11, electricity passes through the charging converter 9 and charges the high-power battery 4 (plug-in charging). Examples of the external charging device 12 include a home charging system for low-speed charging at home using late-night electric power and a high-speed charging system that can charge at a high speed in locations away from home.

Figure 5A:
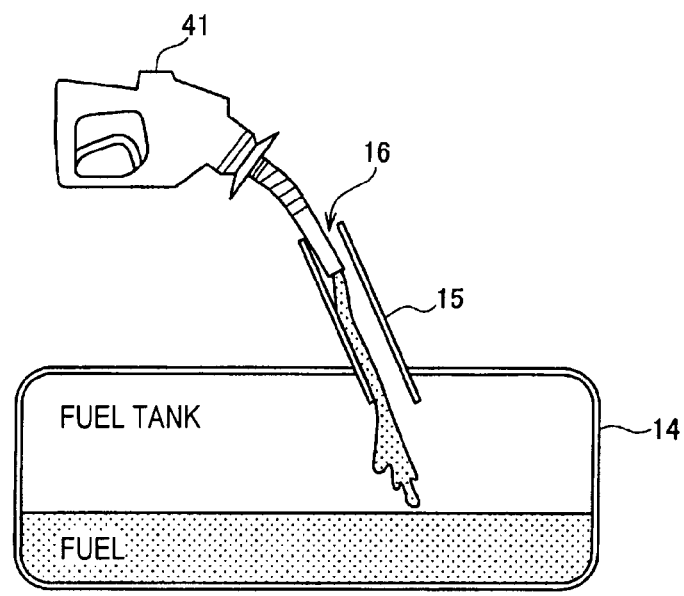
FIG. 5A is diagrammatic view illustrating a mechanism by which fuel dispensed from a refueling nozzle is automatically stopped using a valve.
Figure 5B:
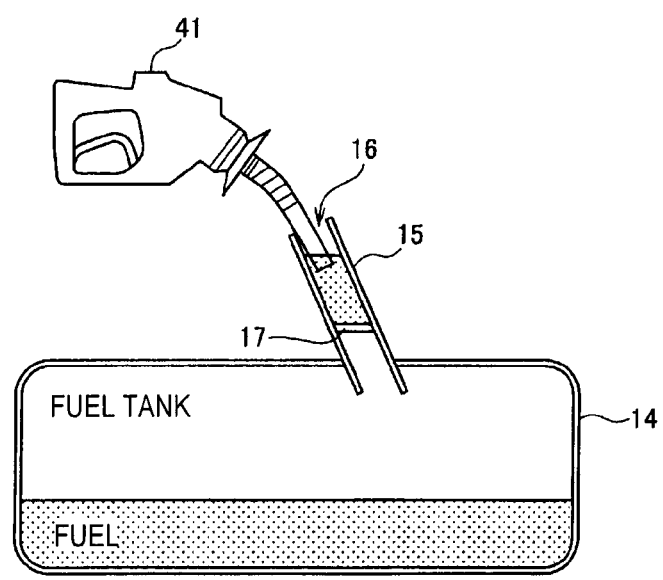
FIG. 5B is diagrammatic view illustrating a mechanism by which fuel dispensed from a refueling nozzle is automatically stopped using a valve.

The fuel tank 14 is a device for storing a combustible fuel (e.g., gasoline, diesel fuel, etc) to be supplied to the engine 1. Fuel stored in the fuel tank 14 is supplied to the engine 1 through a fuel supply passage and a fuel injection apparatus (neither shown in FIG. 1). As seen in FIGS. 1, 5A and 5B, the fuel tank 14 is connected to a refueling port 16 by way of a filler tube 15. The filler tube 15 is a refueling pipe communicating between the fuel tank 14 and the refueling port 16. Fuel supplied to the refueling port 16 flows through the filler tube 15, and is stored in the fuel tank 14. A valve 17 is provided in an intermediate position along the filler tube 15. The valve 17 is configured and arranged to selectively open and close the passageway inside the filler tube 15. Thus, the valve 17 constitutes an opening and closing device that is configured to open and close a passageway inside the filler tube 15. Normally, the refueling port 16 is closed with a filler cap (not shown) and a filler lid 18 formed integrally in a side face of the vehicle body is also closed.

A control system of the electric powered vehicle 100 shown in FIG. 1 basically includes an engine controller (ECM) 20, a generator controller (GC) 21, a motor controller (MC) 22, a battery controller (LBC) 23, a vehicle general controller (VCM) 24, an ignition switch (IGN-SW) 25, a vehicle body control module (BCM) 26, a meter (METER) 27, a navigation controller (NAVI/C) 28, a notification section 29, a transmitter/receiver unit 30, an antenna 31, open-closed state sensor 32, a fuel tank sensor 33 and a tank internal pressure sensor 34. The controllers 20, 21, 22, 23 and 24 are connected with a CAN communication line 35 capable of exchanging information such that various data can be exchanged. Each of the controllers 20, 21, 22, 23 and 24 is a microcomputer that includes one or more microprocessors, a memory and an interface connected to the microprocessor(s). The microprocessors of each of the controllers 20, 21, 22, 23 and 24 execute one or more programs that are stored in the memory. While the controllers 20, 21, 22, 23 and 24 are shown as separate units, the controllers 20, 21, 22, 23 and 24 can be selectively combined in two one or more controllers as needed and/or desired. The engine controller 20 controls an intake air quantity, an ignition timing, and a fuel injection quantity of the engine 1 in accordance with a control command from the vehicle general controller 24 so as to control an output torque of the engine 1. The generator controller 21 controls the generator-motor inverter 7 in accordance with a control command from the vehicle general controller 24 so as to control an input or output torque of the generator-motor 2. The motor controller 22 controls the drive motor inverter 8 in accordance with a control command from the vehicle general controller 24 so as to control an input or output torque of the drive motor 3. The battery controller 23 serves to estimate quantities indicating an internal state of the high-power battery 4, such as a charge ratio (charge capacity) of the high-power battery 4 and an amount of power than can be inputted to or outputted from the high-powered battery 4. The battery controller 23 also serves to control protection of the high-power battery 4. Hereinafter, the charge ratio (charge capacity) of the high-power battery 4 will be called battery SOC (where SOC stands for "state of charge").

The vehicle general controller 24 coordinates the operations of the controllers 20, 21, 22, and 23 and controls the motor drive outputs of the motors 2 and 3 in accordance with requests from a driver. The electric power generation output is controlled while taking into account both a drivability and a fuel efficiency (economy). The vehicle general controller 24 receives information from the ignition switch 25, the vehicle body control module 26, the meter 27, the navigation controller 28 and the sensors 32 to 34, and controls the meter 27, the navigation controller 28, the notification section 29, and the transmitter/receiver unit 30.

The ignition switch 25 is a switch for an ignition device of the engine 1. The ignition switch 25 also serves as a starter motor (cell motor) switch and switches a power supply system of the electric powered vehicle 100 between an operating state and a non-operating state.

The vehicle body control module 26 is an ECU serving to control operations of various electrical components. The vehicle body control module 26 receives a signal from the open-closed state sensor 32 indicating that the refueling port 16 is open and sends a start signal to the vehicle general controller 24 and the meter 27.

The meter 27 receives a signal indicating a fuel quantity detected by the fuel tank sensor 33 and sends a signal indicating an amount of fuel remaining in the fuel tank 14 to the vehicle general controller 24. This meter 27 is equipped with a display device (not shown) configured to display various information based on instructions from the vehicle general controller 24.

The navigation controller 28 is configured to detect a position of the vehicle 100 using a GPS signal from a satellite and to execute route searching and route guidance based on map data stored on a DVD or other medium. The information indicating the vehicle position on a map obtained by the navigation controller 28 is fed to the vehicle general controller 24 along with personal residence position information and charging station position information. The navigation controller 28 is equipped with an input device (input means) with which a passenger can enter various types of information. A passenger can use the input device to enter a destination or a planned driving distance.

The notification device (notifying means) 29 is configured to notify a passenger using an alarm lamp, an alarm sound, or voiced information based on instructions from the vehicle general controller 24. The notification device 29 is, for example, a speaker. The transmitter/receiver device or unit (transmitting means) 30 serves to transmit a signal to a location external to the vehicle through the antenna 31 based on an instruction from the vehicle general controller 24. The antenna 31 is configured to transmit a signal to an external location (e.g., a remotely located fuel dispensing machine or pump at a refueling station) and to receive a signal from an external location (e.g., a remotely located fuel dispensing machine or pump at a refueling station).

The open-closed state sensor 32 is a device that configured to detect if the filler lid 18 is open or closed. Thus, the open-closed state sensor 32 constitutes an example of a refueling operation detecting device or means. In other words, the open-closed state sensor 32 detects a person is in the process of refueling the vehicle 100 by detecting if a open switch of the filler lid 18 has operated or if the filler lid 18 has actually been opened.

The fuel tank sensor 33 is a device that is configured to detect a remaining amount of fuel stored in the fuel tank 14. Thus, the fuel tank sensor 33 constitutes an example of a fuel amount detecting device or means. The fuel tank sensor 33 is, for example, a fuel level gauge. The tank internal pressure sensor 34 is a device that is configured to detect an internal pressure of the fuel tank 14.

Figure 2:
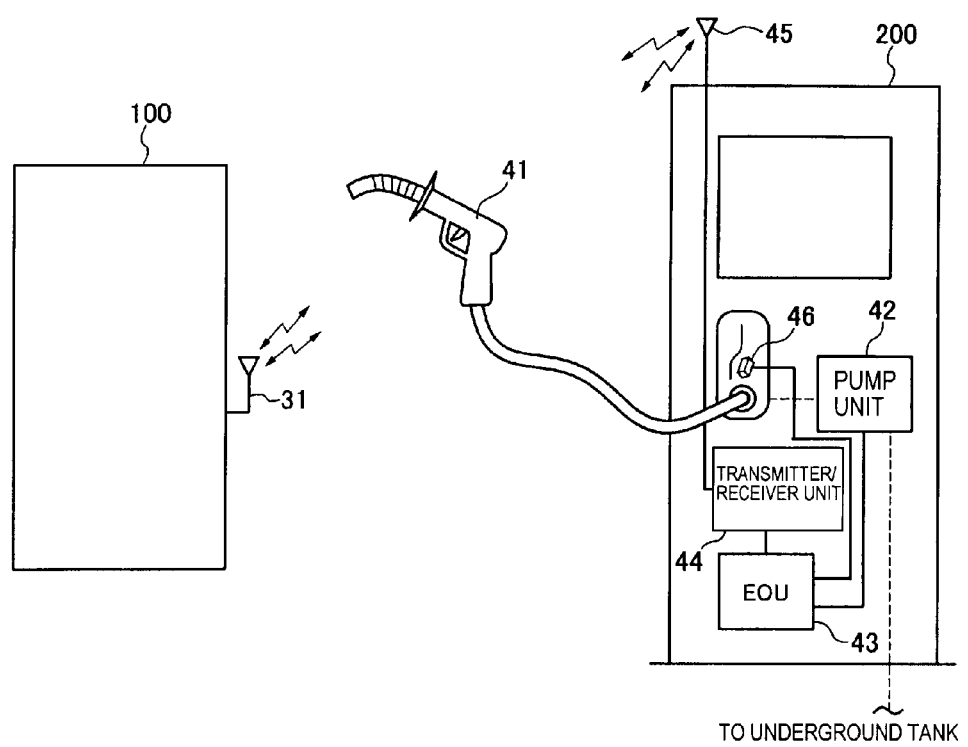
FIG. 2 illustrates an example of a system that includes an electric powered vehicle according to the illustrated embodiment.

FIG. 2 illustrates an example of a system that includes the electric powered vehicle 100 according to the illustrated embodiment. The electric powered vehicle 100 will not be explained here because the electric powered vehicle 100 is the same as the electric powered vehicle of FIG. 1. The fuel dispensing machine or fuel pump 200 illustrates one of a plurality of fuel dispensing machines installed in a refueling station (gasoline filling station). The fuel dispensing machine 200 has a fueling nozzle 41 configured to be inserted into the refueling port 16 (see FIG. 1) of the electric powered vehicle 100. The fueling nozzle 41 is connected to the body of the fuel dispensing machine 200 with a hose. A pump unit 42 inside the fuel dispensing machine 200 pumps fuel to the fueling nozzle 41. In addition to a pump, the pump unit 42 includes a valve for starting and stopping fuel dispensation, a flow rate gauge for detecting a fuel dispensation rate (amount of fuel dispensed per unit time, i.e., refueling rate), and a control section for controlling the amount of fuel dispensed per unit time. The amount of fuel dispensed per unit time can be controlled by controlling a valve opening degree or by controlling a drive quantity of the pump. The pump unit 42 and the ECU 43 function as fuel dispensation stopping device or means and a fuel dispensation rate control device or means.

The pump unit 42 draws fuel from an underground tank installed underneath the refueling station. The pump unit 42 is connected to the ECU 43. The ECU 43 serves to control the pump unit 42 and control the dispensation of fuel from the fuel dispensing machine 200. A transmitter/receiver unit 44 of the fuel dispensing machine 200 is connected to the ECU 43. The transmitter/receiver has an antenna 45 for transmitting signals to the electric powered vehicle 100 and for receiving signals from the electric powered vehicle 100. The ECU 43 receives a signal from the electric powered vehicle 100 and transmits a fuel dispensation stop signal to the electric powered vehicle 100 when the flow of fuel is stopped. The signals are transmitted and received through the transmitter/receiver unit 44 and the antenna 45. The ECU 43, the transmitter/receiver unit 44, and the antenna 45 function as a signal transmitting means and a signal receiving means of the fuel dispensing machine 200. The ECU 43 is also connected to a detection switch 46 configured to detect if the fueling nozzle 41 has been replaced back on the fuel dispensing machine 200.

Figure 3:
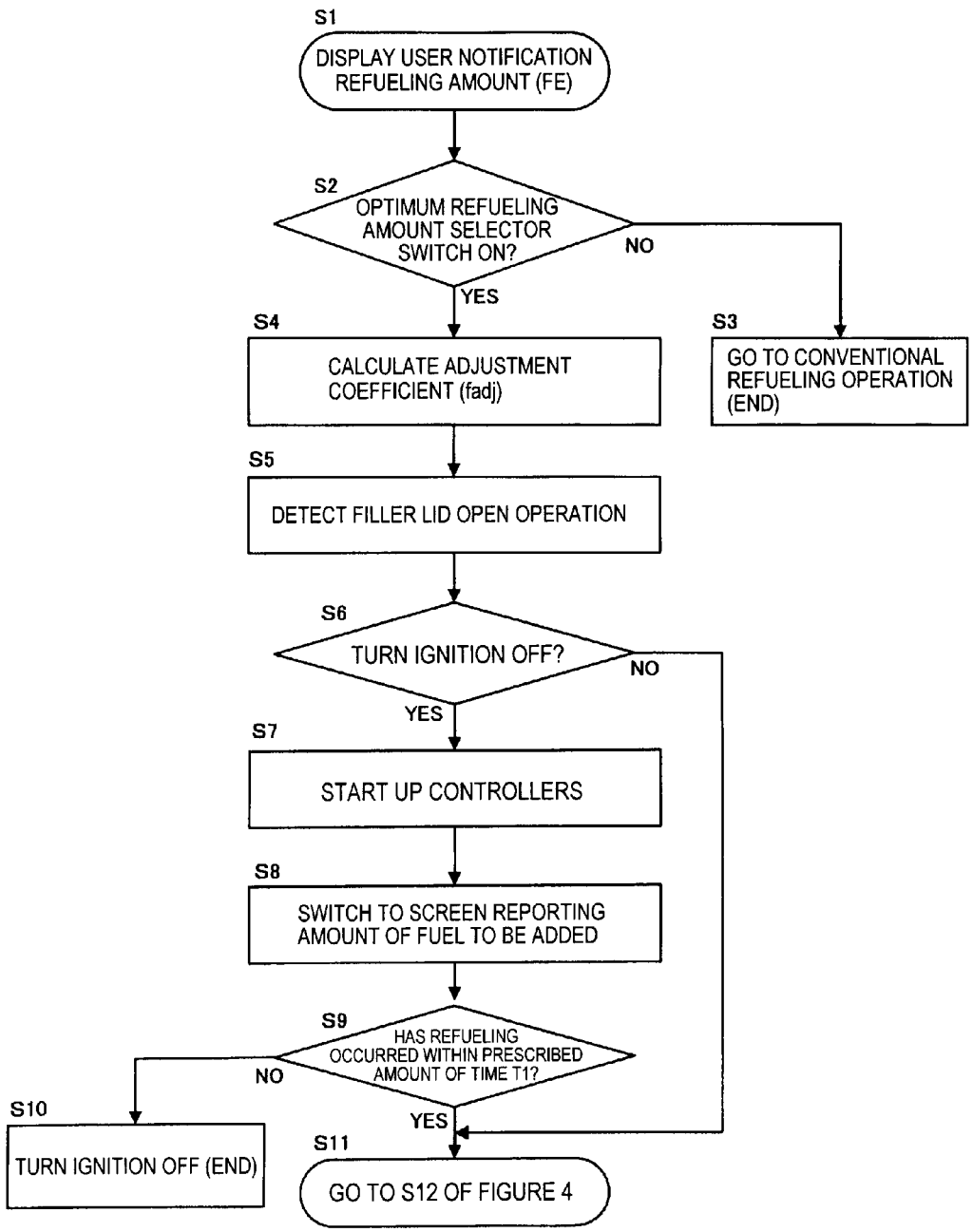
FIG. 3 is a first part of a flowchart showing a control logic executed when refueling the electric powered vehicle according to the illustrated embodiment.

FIG. 3 is a flowchart (part 1) showing a control logic that is executed when refueling the electric powered vehicle 100 according to the illustrated embodiment. In the explanation that follows, the controllers 20, 21, 22, 23, and 24 are referred to collectively as "controller 36" which constitutes a "control device" of the vehicle 100.

Before refueling begins, in step S1, the controller 36, the meter 27, and the navigation controller 28 notifies a passenger of an optimum amount of fuel to be refilled (hereinafter called "user notification refueling amount FE" and expressed in units of L). The user notification refueling amount FE presented in step S1 is an estimated fuel amount that is calculated using a method explained later with reference to FIGS. 7 to 14 (particularly steps S51 to S53 of FIG. 8). The user notification refueling amount FE is an estimated fuel amount that needs to be dispensed into the fuel tank 14 during refueling in order to prevent or diminish the fuel inside the fuel tank 14 from degrading. The user notification refueling amount FE is calculated according to a usage history of the electric powered vehicle 100.

In step S2, the controller 36 determines if an optimum refueling amount selector switch is on or off. A user operates a selector switch (not shown in FIG. 1) provided on the electric powered vehicle 100 to select if the user notification refueling amount FE notified in step S1 will be dispensed or if another amount will be dispensed. The controller 36 determines the selection based on the switch operation performed by the user.

If the determination result of step S2 indicates that the user wishes to dispense another amount other than the user notification refueling amount FE, then, by operating the selector switch, the user can dispense any desired amount of fuel in the conventional manner. If the user notification refueling amount FE will be dispensed (Yes in step S2), then the controller 36 proceeds to step S4. Conversely, if the user will dispense another amount of fuel (No in step S2), then the controller 36 proceeds to step S3 and a normal or standard refueling process is followed in step S3.

In step S4, the controller 36 calculates an adjustment coefficient fadj for the user notification refueling amount FE presented in step S1. The adjustment coefficient fadj is a degradation coefficient determined in accordance with such factors as a manner and a climate in which the electric powered vehicle 100 is used as such factors relate to an amount of time until the fuel becomes degraded. The adjustment coefficient fadj is calculated based on an ambient outside temperature, an air quantity inside the fuel tank 14 (ratio of fuel and air), and acceleration inputs (load inputs) in longitudinal and transverse directions of the vehicle, which serve as indicators of a degree of movement of the fuel (degree of mixing of the air and fuel) inside the fuel tank 14. Thus, the adjustment coefficient fadj is calculated based on a correlation between the amount of time until the fuel becomes degraded and the ambient outside temperature, the air quantity inside the fuel tank 14, and the load inputs of the vehicle.

In step S4, the controller 36 calculates an adjusted target refueling amount FEtotal (=FE×fadj) by calculating a product of the calculated adjustment coefficient fadj and the user notification refueling amount FE. It is also acceptable if the value of the calculated target refueling amount FEtotal is presented in advance in step S1.

Generally speaking, fuel does not degrade readily, for example, when the temperature is low, when the air quantity inside the fuel tank 14 is small (amount of fuel is large), and when an input load of the electric powered vehicle 100 is low (degree of movement of the fuel inside the fuel tank 14 is small). Therefore, in such cases, it is preferable to set the adjustment coefficient to a value equal to or larger than 1 such that an amount of fuel larger than the user notification refueling amount FE is dispensed. In this way, the amount of time until the next refueling can be extended and the frequency of refueling can be reduced.

Afterwards, the controller 36 proceeds to step S5 where the vehicle body control module 26 detects an open operation of the filler lid 18. When a user opens the filler lid 18, the controller 36 detects that an open operation of the filler lid 18 has been executed based on a detection signal from the open-closed state sensor 32.

Afterwards, the controller 36 proceeds to step S6, where the vehicle body control module 26 determines if the ignition switch 25 is off. If the ignition switch 25 is "on" (No in step S6), then the controller 36 proceeds to step S11 (step S12 and subsequent steps shown in FIG. 4).

Meanwhile, if the ignition switch is off (Yes in step S6), then the controller 36 proceeds to step S7, where the vehicle body control module 26 executes a start up procedure for the controllers. The controllers started up in step S7 include the meter 27 which monitors an added fuel amount FEin using the fuel tank sensor 33, the controller 24 which is necessary to operate an actuator necessary to automatically stop the dispensation of fuel by closing a valve 17, and the transmitter/receiver unit 30. That is, the vehicle body control module 26 puts the fuel tank sensor 33, the valve 17, the transmitter/receiver unit 30 into an operating state or a non-operating state.

If the processing of steps S5 to S7 detects an open operation of the filler lid 18 (if it is detected that refueling will take place), then the controllers are started even if the ignition switch 25 is off. As a result, the added fuel amount FEin can be constantly monitored, the valve 17 can be opened and closed, and an alarm sound (alarm lamp) indicating a refuel end timing can be triggered. Moreover, the dispensation of fuel from the fueling nozzle 41 can be stopped. It is also acceptable to use an alarm lamp or an alarm sound to notify a passenger that the controllers have been started up.

The controller 36 then proceeds to step S8, where the controller 36 switches a display screen of the meter 27 or the navigation controller 28 to a screen for informing a passenger of an amount of fuel to be added to the fuel tank (user notification refueling amount FE or revised target refueling amount FEtotal). Due to the processing of step S8, even if the meter 27 is indicating fuel efficiency information or the navigation controller 28 is indicating map information, the controller 36 determines that a refueling situation exists and automatically switches to a screen reporting the amount of fuel to be dispensed to the vehicle. As a result, it is possible to eliminate the need for a user to perform an operation to change screens.

In step S9, the controller 36 determines if refueling occurred before a prescribed amount of time t1 elapsed based on an amount of time elapsed since the controllers were started up in step S7. If refueling did occur before the prescribed amount of time t1 elapsed (Yes in step S9), then the controller 36 proceeds to step S11 (step S12 and subsequent steps shown in FIG. 4). The time t1 indicates a threshold value for the amount of time elapsed since the controller 36 was started up, but the invention is not limited to such a threshold value. For example, it is also acceptable if the time t1 indicates a threshold value for the amount of time elapsed since the filler lid 18 was opened.

Meanwhile, if refueling is not taking place (No in step S9), then the controller 36 proceeds to step S10 where the controller 36 executes a self shutdown such that the controllers and the ignition switch 25 are turned "off". Step S10 prevents the controllers from remaining on and draining the battery when the filler lid 18 is open for a reason other than refueling (e.g., when the filler lid 18 is opened during car washing or when a user forgot to close the filler lid 18 after refueling). It is acceptable to contrive the vehicle such that an alarm lamp or an alarm sound is triggered to report that the controllers will be shut down before the controllers are actually shut down.

Figure 4:
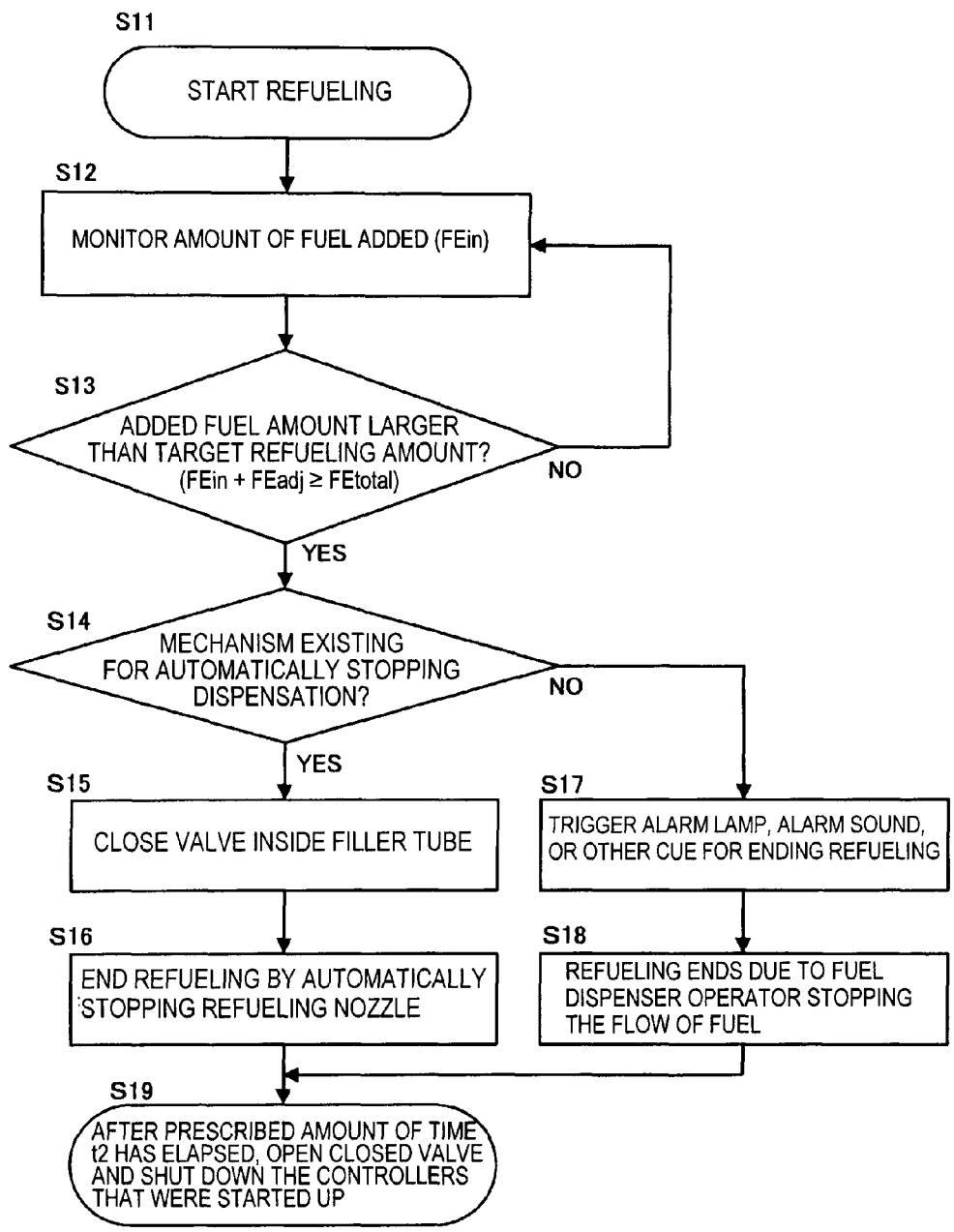
FIG. 4 is a first part of a flowchart showing a control logic executed when refueling the electric powered vehicle according to the illustrated embodiment.

FIG. 4 is a second portion of the flowchart shows a control logic that is executed when refueling the electric powered vehicle 100 according to the illustrated embodiment. When refueling starts, in step S12, the controller 36 monitors the actual amount of fuel added (FEin in units of L) to the electric powered vehicle 100. A conventional method of monitoring the amount of fuel added is to monitor the amount of fuel inside the fuel tank 14 (a fuel measurement method for when a remaining fuel amount is indicated on the meter 27). If the electric powered vehicle 100 and the fuel dispensing machine 200 can communicate, then information indicating an amount of fuel that has been dispensed at a current point in time can be transmitted from the fuel dispensing machine 200 to the electric powered vehicle 100.

In step S13, the controller 36 determines if the added fuel amount FEin monitored in step S12 is larger than the target refueling amount FEtotal. More specifically, the controller 36 determines if the relationship FEin+FEadj≥ FEtotal exists. The term FEadj is an amount of fuel determined based on a delay time between when an actuator operation occurs or a user receives a cue for ending fuel dispensation and when fuel dispensation actually ends (fuel dispensation end timing adjustment coefficient in units of L). The value of FEadj is determined by taking into account an amount of time required for an actuator to operate in order for the fueling nozzle 41 to automatically stop the flow of fuel or by taking into account a delay time until a cue, e.g., an alarm lamp or an alarm sound, for ending fuel dispensing is issued to the user. It is also acceptable to contrive step S13 such that the controller 36 determines if the added fuel amount FEin is larger than the user notification refueling amount FE.

If the result of step S13 is No, then the controller 36 returns to step S12 and monitors the added fuel amount FEin until the result of step S13 becomes Yes. Meanwhile, if the result of step S13 is Yes, then the controller 36 proceeds to step S14.

In step S14, the controller 36 determines if there is a mechanism for automatically stopping the dispensation of fuel from the fueling nozzle 41 at a desired amount. For example, the valve 17 is configured such that it can open and close a flow passage inside the filler tube 15. Thus, the valve 17 is mechanism for automatically stopping the dispensation of fuel from the fueling nozzle 41.

FIGS. 5A and 5B illustrate a mechanism by which fuel dispensed from the fueling nozzle 41 is automatically stopped using the valve 17. FIG. 5A shows the valve 17 in an open state, while FIG. 5B shows the valve 17 in a closed state. As shown in FIG. 5A, when the valve 17 is open, fuel can be dispensed from the fueling nozzle 41 in a normal manner. Conversely, when the valve 17 closes as shown in FIG. 5B while fuel is being dispensed, the fuel does not pass into the fuel tank 14 and an imaginary full-tank liquid surface develops in the passageway of the filler tube 15. Thus, when the fuel contacts a tip end of the fueling nozzle 41, the fueling nozzle 41 determines that the tank is full and the flow of fuel from the fueling nozzle 41 is stopped automatically.

If the controller 36 determines in step S14 that the aforementioned mechanism exists (Yes in step S14), then the controller 36 sends an instruction for closing the valve 17 in order to stop the refueling, thereby closing the valve 17 (step S15). The controller 36 then proceeds to step S16 where the controller 36 stops the fueling nozzle 41 automatically, thereby ending the fuel dispensation.

In step S15, the controller 36 closes the valve 17 based on the target refueling amount FEtotal. As a result, an imaginary full-tank fuel surface is produced inside the filler tube 1 before the fuel tank 14 becomes full and the flow of fuel from the fueling nozzle 41 is stopped automatically. In this way, excess fuel that could become degraded inside the fuel tank 14 can be prevented from entering the fuel tank 14 and a passenger can be relieved of the task of discarding fuel. Also, a passenger or filling station staff person can simply squeeze the refilling gun 41 until the flow of fuel stops automatically without the need to check the amount of dispensed fuel.

It is also acceptable to contrive step S15 such that the controller 36 transmits information indicating the target refueling amount FEtotal to the fuel dispensing machine 200 through the transmitter/receiver unit 30 and the antenna 31. In such a case, the fuel dispensing machine 200 automatically stops the dispensation of fuel based on the target refueling amount FEtotal received from the electric powered vehicle 100. In this way, excess fuel that could become degraded inside the fuel tank 14 can be prevented from entering the fuel tank 14 and a passenger can be relieved of the task of discarding fuel.

By executing step S15, the controller 36 automatically stops the dispensation of fuel when the target refueling amount FEtotal is reached. In this way, excess fuel that could become degraded inside the fuel tank 14 can be prevented from entering the fuel tank 14 and a passenger can be relieved of the task of discarding fuel.

Meanwhile, if the controller 36 determines in step S14 that the aforementioned mechanism does not exist (No in step S14), then the controller 36 proceeds to step S17 where the controller 36 uses the notification section 29 to issue a cue for ending the dispensation of fuel, e.g., an alarm lamp or an alarm sound, to a passenger or a filling station staff person (hereinafter called a "fuel dispenser operator"). In step S17, in order to prompt the fuel dispenser operator to stop dispensing fuel, the controller 36 executes an operation to convey information indicating that the amount of dispensed fuel is approaching the target refueling amount FEtotal. As the alarm lamp or alarm sound, it is acceptable to use, for example, a directional lamp, a hazard lamp, a meter alarm lamp, or a steering wheel horn. It is also acceptable to use a device that is attached to the filler lid 18 for emitting an alarm light or an alarm sound. The controller 36 then proceeds to step S18 where the fuel dispenser operator stops dispensing fuel, thereby ending the fuel dispensation.

In step S17, if the amount of fuel inside the fuel tank 14 has drawn close to the target refueling amount FEtotal, then the controller 36 triggers an alarm lamp or an alarm sound to notify the fuel dispenser operator that refueling should be ended. In this way, the dispensation of fuel can be stopped when the target refueling amount FEtotal is nearly reached even if the fuel dispenser operator is not aware of the target refueling amount FEtotal in advance or if the electric powered vehicle 100 is not provided with a valve 17.

After fuel dispensing is ended according to step S16 or S18, the controller 36 proceeds to step S19 where the controller 36 determines that fuel dispensing has ended and opens the valve 17 closed in step S15. The controller 36 also shuts down the controllers started in step S7 with a self-shutdown operation in step S19.

Figure 6:
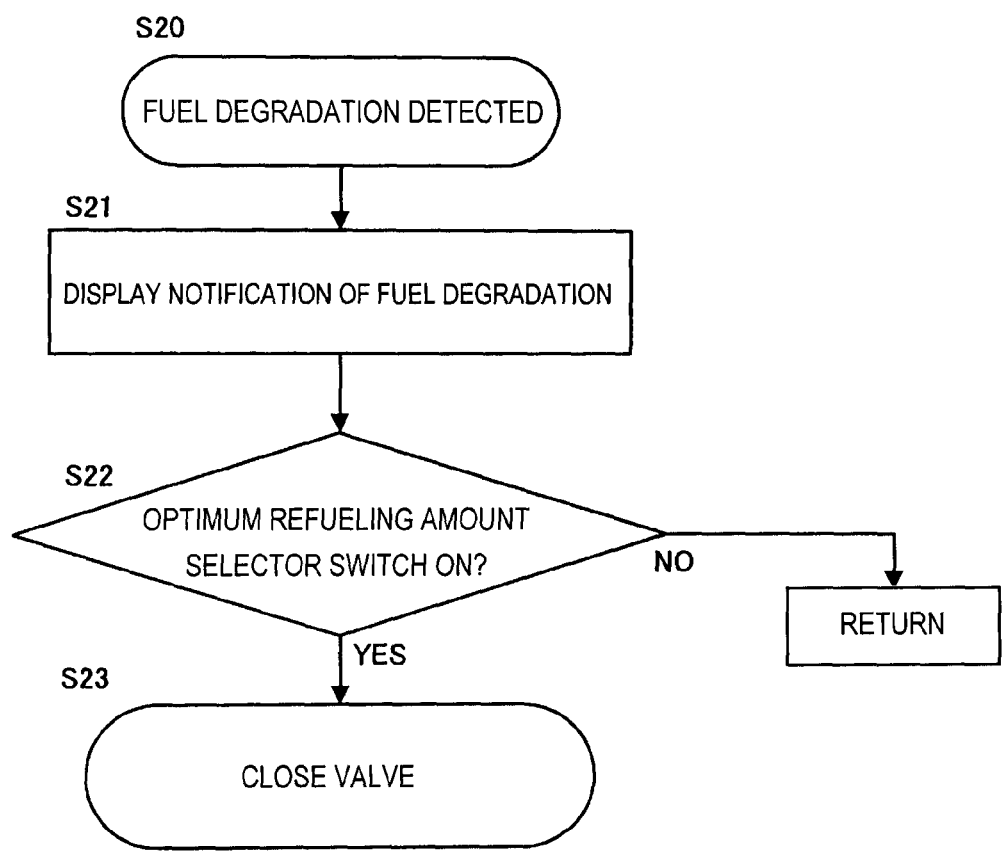
FIG. 6 is a flowchart showing a control logic that is followed when it has been detected that fuel has degraded in an electric powered vehicle according to an embodiment.

FIG. 6 is a flowchart showing a control logic that is followed when the controller 36 has been detected that fuel has degraded in an electric powered vehicle 100 according to the illustrated embodiment.

In step S20, the controller 36 detects if the fuel is degraded. If it is detected that the fuel is degraded (i.e., contains oxides), then there is a possibility that any additional fuel added to the fuel tank will also become degraded. Examples of methods of detecting degraded fuel include estimating a number of days since a previous refueling and surmising if a degraded state exists based on an amount of oxygen with respect to fuel inside the fuel tank 14 (relationship of fuel amount and tank volume).

In step S21, the controller 36 uses the meter 27 or the navigation controller 28 to indicate to the fuel dispenser operator that the fuel is degraded. Here, it is also acceptable to indicate that adding fuel is prohibited and that the fuel should be changed.

In step S22, the controller 36 determines if an optimum refueling amount selector switch (not shown in FIG. 1) provided on the electric powered vehicle 100 is on or off. By operating the selector switch, a user selects whether to dispense any desired amount of fuel or to dispense the user notification refueling amount FE reported in step S1 of FIG. 3. The controller 36 determines the user's selection based on the status of this switch. If the user selects the user notification refueling amount FE (Yes in step S22), i.e., if the user is attempting to dispense the user notification refueling amount FE regardless of the fuel being degraded, then the controller 36 closes the valve 17 (step S23) to prevent fuel from being added to the tank or to limit the amount of fuel that can be added. When the valve 17 is closed, the fueling nozzle 41 determines that the tank is full due to an imaginary full-tank fuel surface as previously explained and automatically stops dispensing fuel. Meanwhile, if the user selects to add a desired amount of fuel (No in step S22), then the controller 36 returns to the beginning of the control sequence.

By closing the valve 17 in step S23 when degraded fuel is detected, the controller 36 automatically stops the flow of fuel from the fueling nozzle 41. In this way, additional fuel can be prevented from entering the fuel tank and the fuel that was added to the fuel tank can be prevented from degrading. It is also acceptable to contrive step S23 such that the controller 36 transmits a command to the fuel dispensing machine 200 through the transmitter/receiver unit 30 and the antenna 31 instructing to automatically stop the dispensing of fuel.

Figure 7:
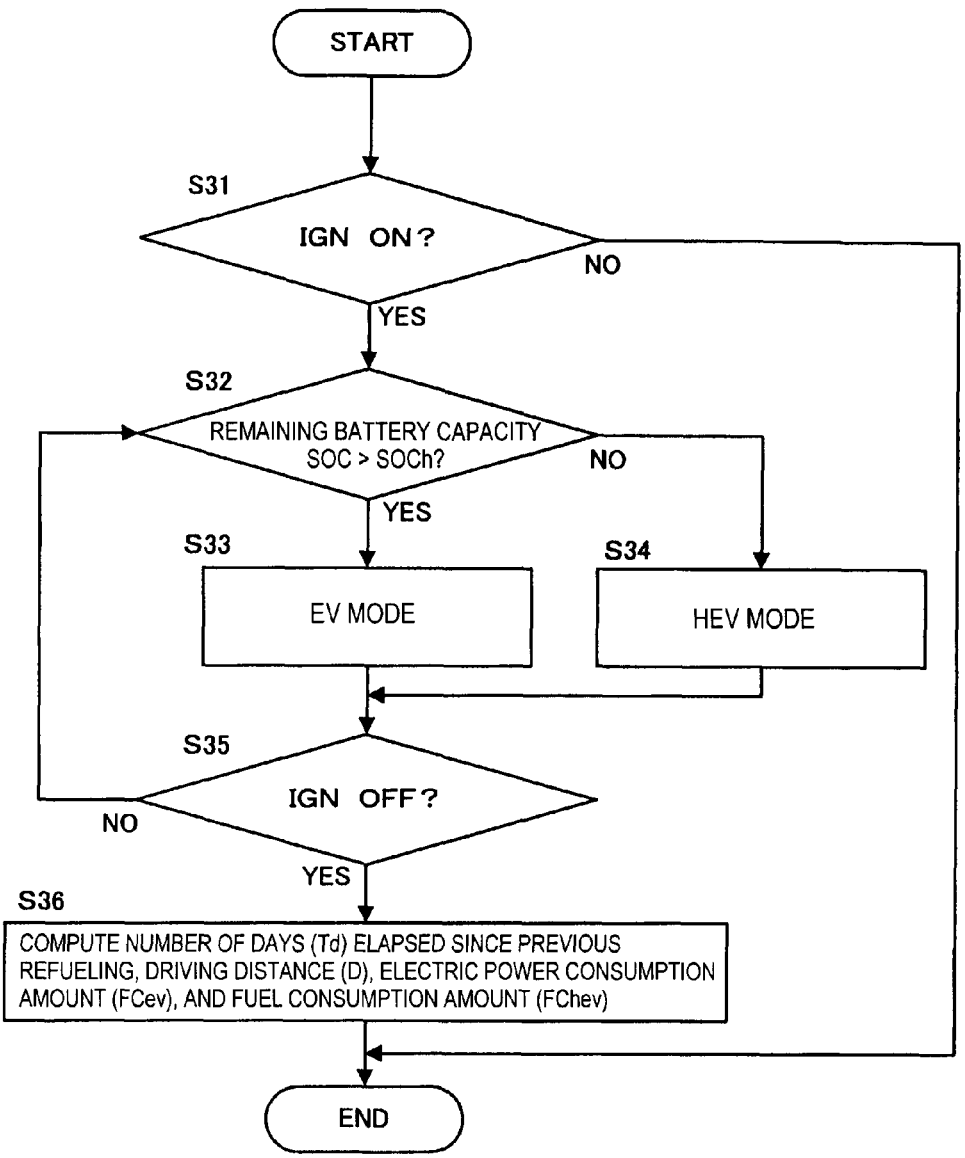
FIG. 7 is a flowchart showing a control logic used to calculate an electric power consumption efficiency during EV travel and a fuel efficiency during HEV travel in the electric powered vehicle according to the illustrated embodiment.

A method of calculating the user notification refueling amount will now be explained using the FIGS. 7 to 14. FIG. 7 is a flowchart showing a control logic that is followed in order to calculate an electric power consumption efficiency during EV travel and a fuel efficiency during HEV travel in an electric powered vehicle 100 according to the illustrated embodiment.

In step S31, the controller 36 determines if the ignition switch 25 is on or off. If the ignition switch 25 is on (Yes in step S31), then the controller 36 proceeds to step S32 to determines if a battery remaining capacity SOC (remaining capacity of the high-power battery 4 at a current point in time) is larger than a threshold value SOCh (a SOC lower limit value for transitioning to the HEV mode). Meanwhile, if the ignition switch 25 is off (No in step S31), then the control sequence is ended.

If the battery remaining capacity SOC is larger than the threshold value SOCh (Yes in step S32), then the controller 36 executes control such that the electric powered vehicle 100 travels in EV mode because it is not necessary to transition to HEV mode. Meanwhile, if the battery remaining capacity SOC is smaller than the threshold value SOCh (No in step S32), then the controller 36 executes control such that the electric powered vehicle 100 travels in HEV mode because it is necessary to transition to HEV mode.

Afterwards, the controller 36 determines if the ignition switch 25 is on or off (step S35). If the ignition switch 25 is on (No in step S35), then the controller 36 returns to step S32 and repeats the same processing. If the ignition switch 25 is off (Yes in step S35), then the controller 36 proceeds to step S36.

In step S36, the controller 36 computes a number of days elapsed (Td in units of days) since a previous time when refueling occurred (when refueling was recognized), a driven distance per single trip (D in units of km), an amount of electric power consumed (FCev in units of kWh) while driving in EV mode, and an amount of fuel consumed (FChev in units of L) while driving in HEV mode. The controller 36 then stores these quantities in a memory in step S36.

In step S36, the controller 36 calculates an electric power consumption efficiency (km/kWh) for EV mode based on an amount of electric power (KWh) extracted from the high-power battery 4 while driving in EV mode and a distance driven (km) while in EV mode. The controller 36 also calculates an amount of fuel (L) consumed by summing amounts of fuel ejected from a fuel injector while driving in HEV mode and calculates a fuel efficiency (km/L) for HEV mode based on the calculated amount of fuel (L) consumed and a distance driven (km) while in EV mode.

By executing the processing explained above, the controller 36 calculates an electric power consumption efficiency for EV mode and a fuel efficiency for HEV mode per single trip and also records a number of days elapsed since the a previous refueling.

Figure 8:
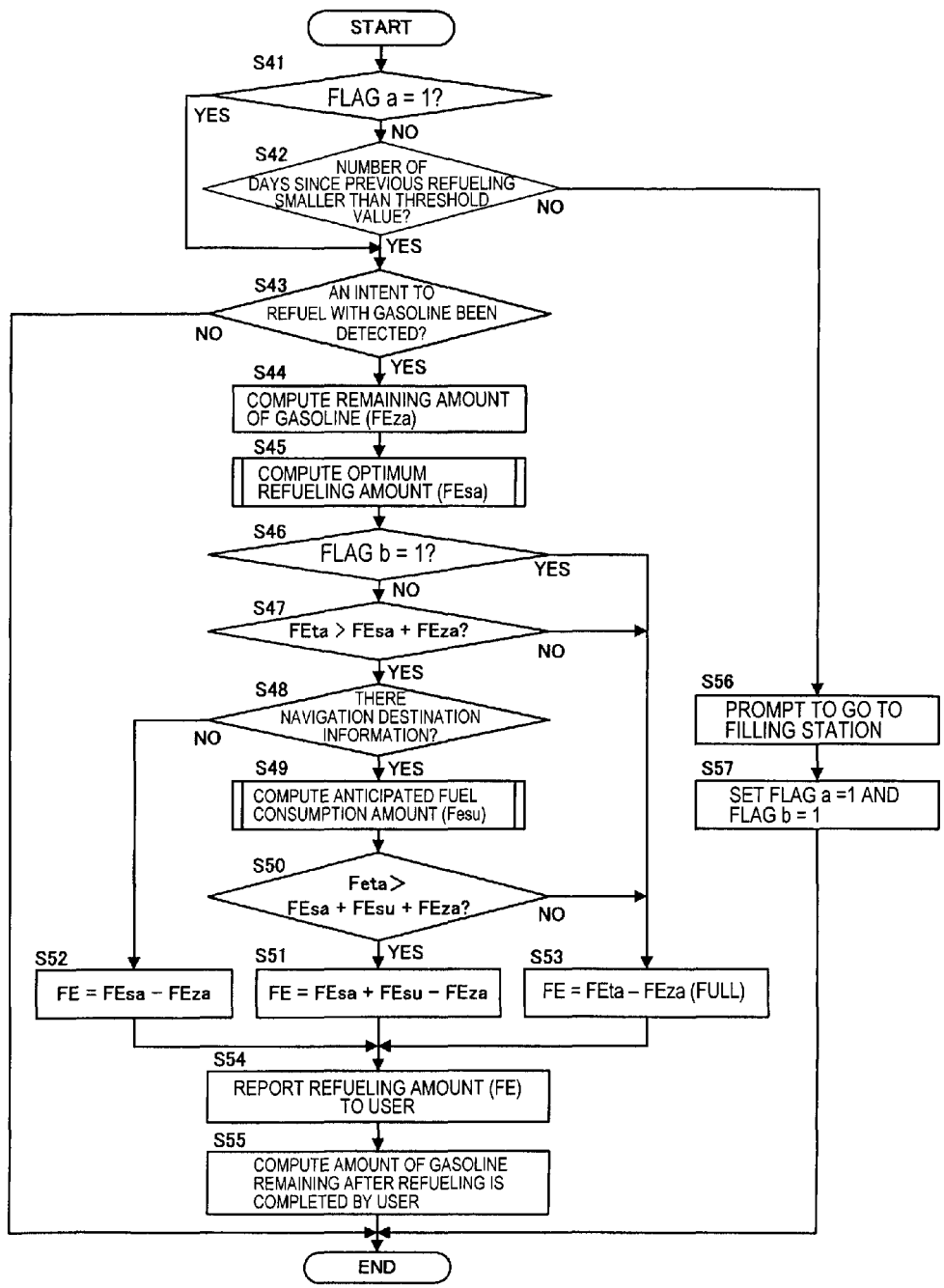
FIG. 8 is a flowchart showing a control logic for calculating a user notification refueling amount FE in an electric powered vehicle according to the illustrated embodiment.

FIG. 8 is a flowchart showing a control logic that is followed to calculate a user notification refueling amount FE in an electric powered vehicle 100 according to the illustrated embodiment. The controller 36 has two flags a and b executes the control logic shown in FIG. 8 using the two flags a and b. The values of the flags a and b are reset to 0 each single trip.

In step S41, the controller 36 determines if the condition flag a=1 exists. If the condition a=1 exists (Yes in step S41), then the controller 36 proceeds to step S43. Meanwhile, if the flag a≠1 (No in step S41), then the controller 36 determines if the number of days Td elapsed since the previous refueling is smaller than a threshold value Tre in step S42. Step S42 will now be explained using FIG. 9.

Figure 9:
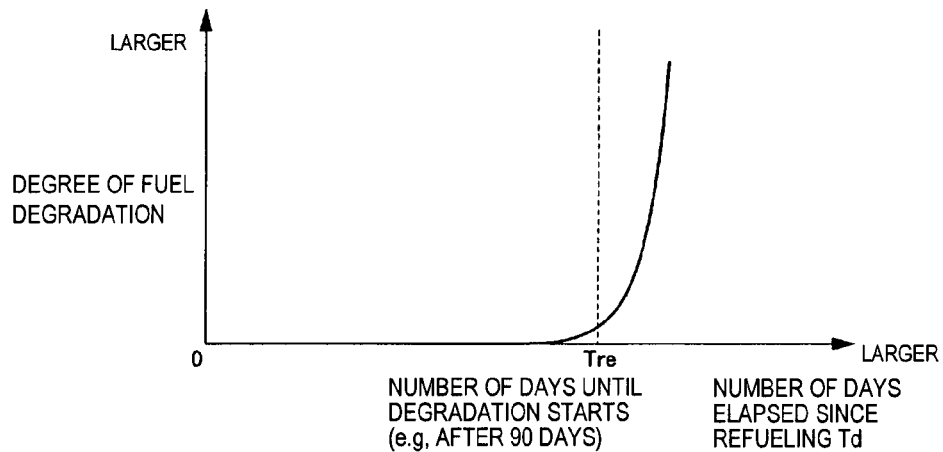
FIG. 9 shows a relationship between a fuel degradation degree and a number of days elapsed since refueling.

FIG. 9 shows a relationship between a number of days elapsed since refueling and a degree of fuel degradation.

As shown in FIG. 8, when the number of days Td elapsed since refueling exceeds a threshold number of days Tre (e.g., 90 days), the degree of fuel degradation tends to increase. Fuel degradation refers to fuel inside the fuel tank 14 bonding with oxygen contained in the same tank and becoming degraded with oxides.

This kind of oxide degradation of the fuel occurs in a series-type plug-in hybrid vehicle like that presented in this embodiment when the vehicle is recharged every day and daily commuting is done solely in EV mode such that fuel is seldom consumed on weekdays. Oxide degradation of the fuel occurs less readily when the fuel tank is full and the air layer inside the tank is small. Also, since fresh fuel contains an antioxidant, the degree of fuel degradation tends to decrease after refueling. Furthermore, by using an airtight tank as the fuel tank 14, fuel degradation can be prevented in an effective manner because an oxygen temperature inside the fuel tank does not change. Thus, the threshold number of days Tre can be said to be a number of days over which the fuel inside the fuel tank 14 can be prevented from degrading and a performance of the fuel can be ensured. Consequently, in the aforementioned step S42, the number of days Td elapsed since a previous refueling and the threshold value Tre are compared to determine if a degree of fuel degradation is high. It is preferable for the threshold value Tre to be smaller than a number of days until fuel degradation starts (not larger than the number of days until fuel degradation starts).

Figure 10:
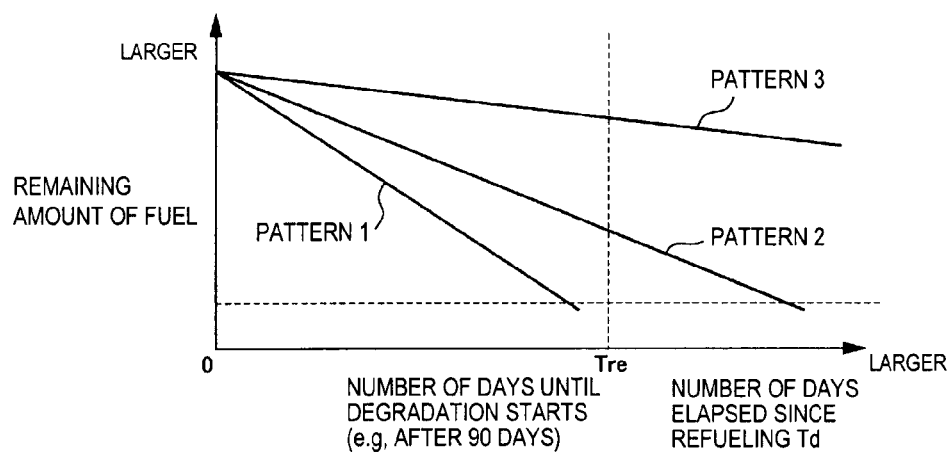
FIG. 10 shows a relationship between a remaining fuel quantity and a number of days elapsed since refueling.

FIG. 10 shows a relationship between a number of days elapsed since refueling and a remaining amount of fuel. The pattern 1 shown in FIG. 10 illustrates a case in which fuel inside the fuel tank 14 can be consumed before the threshold number of days Tre elapses. In such a case, the only notification issued to a driver is a notification to refuel. In this case, the vehicle is used in such a manner that the fuel will not degrade even if the fuel tank is filled. The pattern 2 shown in FIG. 10 illustrates a case in which fuel degradation could occur. In such a case, it is preferable for a notification to be issued to a driver before the number of days until degradation starts has elapsed. Pattern 3 of FIG. 10 illustrates a case in which the vehicle is driven mainly in EV mode and the fuel consumption is small, which are conditions under which fuel degradation occurs most readily. In such a case, similarly to pattern 2, it is preferable for a notification to be issued to a driver before the number of days until degradation starts has elapsed. It is preferable for as large an amount of fuel as possible to be put into the fuel tank. The patterns 2 and 3 shown in FIG. 10 are such that if for example, the fuel tank is filled when the amount of fuel has decreased 15 L, then oxidation can be suppressed because the amount of air (oxygen) is smaller. Additionally, oxidation is suppressed because the 15 L of fresh fuel added to the fuel tank contains an antioxidant.

If the controller 36 determines in step S42 of FIG. 8 that the number of days elapsed (Td) is smaller than the threshold value Tre (Yes in step S42), then the controller 36 proceeds to step S43 because the fuel is not degraded. Meanwhile, if the number of days elapsed is larger than the threshold value Tre (No in step S42), then the controller 36 proceeds to step S56 because the fuel is degraded.

In step S43, the controller 36 detects an intent to refuel with gasoline (step S43). The intent to refuel with gasoline is detected when GPS information obtained by the navigation controller 28 indicates that the electric powered vehicle 100 is at a filling station or when a driver has depressed a fueling port open switch.

If an intent to refuel with gasoline is detected (Yes in step S43), then the controller 36 computes a remaining quantity (FEza in units of L) of fuel inside the fuel tank 14 (step S44). The remaining fuel quantity is computed, for example each time the ignition is turned off, but it is also acceptable to compute the remaining fuel quantity on an ongoing basis. Examples of methods of calculating the remaining fuel quantity include calculating based on a fuel level inside the fuel tank 14 measured by the fuel tank sensor 33 (fuel level gauge) and a current tilt determined based on information from a G sensor, and calculating based on a computed amount of fuel (FChev) consumed in HEV mode and a fuel level measured inside the fuel tank 14 by the fuel tank sensor 33 (fuel level gauge) in a first control cycle after refueling ended.

Afterwards, the controller 36 computes an optimum refueling amount (FEsa in units of L) (step S45). The optimum refueling amount is an optimum value of a refueling amount that can prevent degradation of the fuel and is determined in accordance with a behavior pattern of a user (including a past usage history of the vehicle. A method of computing the optimum refueling amount will be explained later in more detail with reference to FIG. 12.

In step S46, the controller 36 determines if the condition flag b=1 exists (step S46). If the condition b=1 exists (Yes in step S46), then the controller 36 proceeds to step S63. If the condition b≠1 exists (No in step S46), then the controller 36 determines if the tank capacity (maximum fuel capacity Feta in units of L) of the fuel tank 14 is larger than a sum of the remaining fuel amount (FEza) inside the fuel tank 14 and the optimum refueling amount (FEsa) computed in step S45, i.e., if it is possible to add the optimum refueling amount (FEsa) of fuel to the fuel tank (step S47).

If the relationship FEta>FEza+FEsa exists (Yes in step S47), i.e., if there is enough space in the fuel tank 14 to add the optimum refueling amount (FEsa), then the controller 36 proceeds to step S48. Meanwhile, if the relationship FEta≤FEza+FEsa exists (No in step S47), i.e., if there is not enough space inside the fuel tank 14 to add the optimum refueling amount (FEsa), then the controller 36 sets the value FE=Feta+Feza as the user notification refueling amount (FE) such that the fuel tank will be filled (step S53).

In step S48, the controller 36 determines if the navigation controller 28 has destination information, i.e., if a destination has been set (step S48). If a destination is set (Yes in step S48), then the controller 36 computes an anticipated fuel consumption amount (FEsu in units of L) (step S49). The anticipated fuel consumption amount (FEsu) estimates an amount of fuel that will be consumed in order to reach the destination based on past driving distance information. A method of computing the anticipated fuel consumption amount will be explained later in more detail with reference to FIG. 14.

Then, the controller 36 determines if the tank capacity (FEta) of the fuel tank 14 is larger than a sum of the remaining amount of fuel in the fuel tank 14, the optimum refueling amount (FEza) computed in step S45, and the anticipated fuel consumption amount (FEsu) computed in step S49, i.e., if the optimum refueling amount (FEsa) and the anticipated fuel consumption amount (FEsu) can be added to the fuel tank 14 (step S50).

If the relationship FEta>FEsa+FEsu+FEza exists (Yes in step S50), i.e., if there is enough space inside the fuel tank 14 to add the optimum refueling amount (FEsa) and the anticipated fuel consumption amount (FEsu), then the controller 36 sets the value FE=FEsa+FEsu−FEza as the user notification refueling amount (FE in units of L).

Meanwhile, if the relationship FEta≤FEsa+FEsu+FEza exists (No in step S50), i.e., if there is not enough space inside the fuel tank 14 to add the optimum refueling amount (FEsa) and the anticipated fuel consumption amount (FEsu), then the controller 36 sets the value FE=FEta−FEza as the user notification refueling amount (FE) such that the fuel tank will be filled (step S53).

If it is determined in step S48 that a destination is not set (No in step S48), then the controller 36 sets the value FE=FEsa−FEza as the user notification refueling amount (FE).

When the controller 36 reaches step S54 via the step S51, S52, or S53, the controller 36 notifies a user of the user notification refueling amount (FE) (step S54). Methods of reporting the refueling amount include using navigation voice guidance through the notification section (e.g., speaker) 29, displaying the refueling amount on navigation screen through the navigation controller 28, indicating the refueling amount on an indicator in the meter, and communicating the refueling amount to a mobile telephone connected to the navigation controller 28.

Figure 11A:
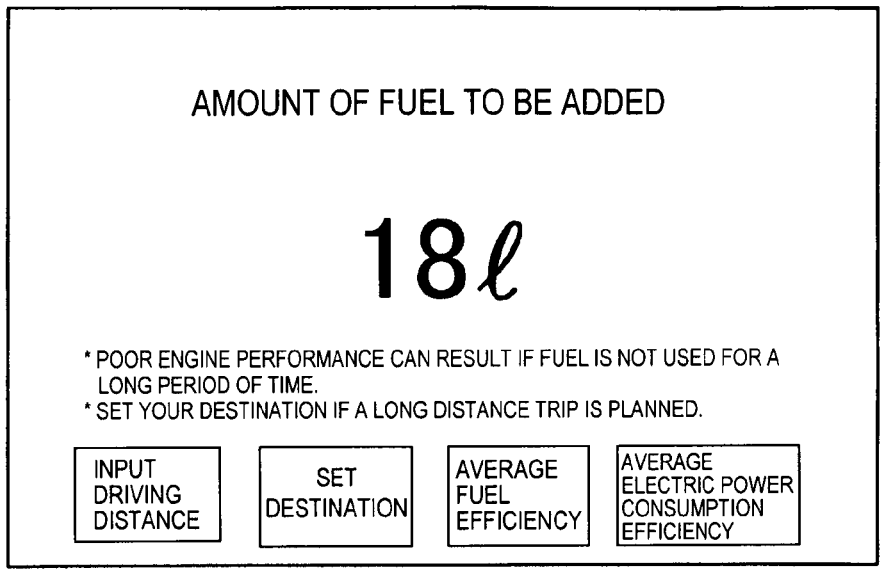
FIG. 11A shows an example of a screen notifying a refueling amount in the electric powered vehicle according to the illustrated embodiment.
Figure 11B:
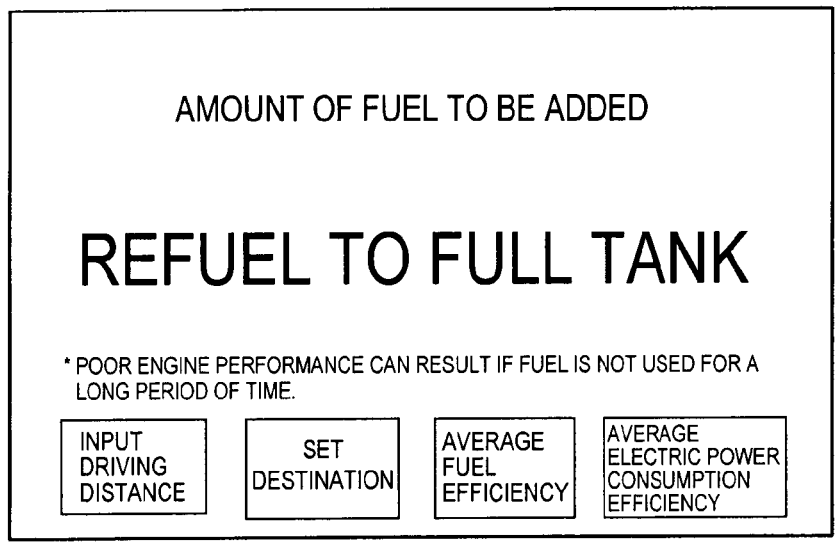
FIG. 11B shows another example of a screen notifying a refueling amount in an electric powered vehicle according to the illustrated embodiment.

FIG. 11A shows an example of a screen notifying a refueling amount in an electric powered vehicle 100 according to the illustrated embodiment. FIG. 11B shows another example of a screen notifying a refueling amount in an electric powered vehicle 100 according to the illustrated embodiment. The case shown in FIG. 11A is an example in which the user notification refueling amount (FE) is computed in steps S51 and S52 and a message indicating that 18 L should be dispensed is displayed on a navigation screen. The case shown in FIG. 11B is an example in which the user notification refueling amount (FE) is computed in step S53 and a message indicating that the fuel tank should be filled with fuel is displayed on a navigation screen.

In step S55 of FIG. 8, after a user refuels the vehicle, the controller 36 computes an amount of fuel (FEza) remaining in the fuel tank 14 and stores the amount in a memory (step S55).

If the controller 36 proceeds to step S56 due to a result of No in step S42, then the controller 36 issues a notification prompting refueling (step S56). The same methods of notification can be used here as for the refueling amount notification explained earlier. After the user is notified, the controller 36 sets both the flags a and b to 1 (step S57). Step S57 ensures that if the sequence of operations shown in FIG. 8 is repeated within the same trip, then the result of step S41 will be Yes and the controller 36 will not return to step S56. This enables annoying repetition of step S56 to be reduced. Similarly, when the sequence of operations shown in FIG. 8 is repeated, the result of step S46 will be Yes and a full tank is set as the user notification refueling amount (FE). Consequently, if the fuel is degraded, then a user is always instructed to fill the fuel tank so that the degradation of the fuel can be suppressed.

Thus, through the control operations explained above, the controller 36 notifies a passenger of an amount of fuel that should be added to the fuel tank or indicates to a passenger that the vehicle should be taken to a filling station based on a number of days since a previous refueling, an intent to refuel with gasoline, or navigation system destination information.

By executing step S43, the controller 36 notifies a user of a refueling amount when it is determined that the electric powered vehicle 100 is at a filling station based on GPS information obtained by the controller 28. In this way, a degree of annoyance to a passenger can be reduced by only notifying the passenger of a refueling amount when notification is necessary, i.e., prior to refueling.

By executing step S51, the controller 36 sets the amount of fuel to be added to the fuel tank 14 to a sum of an optimum refueling amount (FEsa) and an anticipated fuel consumption amount (FEsu) required to reach a destination. When the vehicle is driven over a long distance, using a small refueling amount (optimum refueling amount (FEsa)) will increase the number of times a passenger goes to a filling station and become a nuisance instead of helpful. When a destination is set, the controller 36 reports a refueling amount that takes into account the anticipated fuel consumption amount (FEsu) determined based on a distance to the destination. In this way, the degree of annoyance to a passenger can be reduced and excess fuel that could become degraded inside the fuel tank 14 can be prevented from being added. As will be explained in more detail later using FIG. 14, if a planned driving distance has been entered, it is acceptable to report a refueling amount that takes into account an anticipated fuel consumption amount (FEsu) determined based on the planned driving distance.

By executing step S56, when a number of days since a previous refueling exceeds a prescribed threshold number of days determined as a threshold for degradation of the fuel, the controller 36 notifies a passenger that the vehicle should be taken to a filling station even if the vehicle is being driven. Even if there is fuel remaining in the fuel tank 14 and it is not necessary to refuel, a passenger is prompted to refuel so that degradation of the fuel can be avoided.

Although in steps S54 and S56 the controller 36 notifies a passenger of an amount of fuel that should be added to the fuel tank or prompts a passenger to take the vehicle to a filling station, the target of the notification is not limited to a passenger. It is acceptable for the targeted person to be a staff member of a filling station.

Although in steps S53 and S54 the controller 36 notifies a passenger that the fuel tank should be refueled until full, it is also acceptable if the controller 36 reports a refueling amount that will result in a full tank.

Also, in step S56, instead of prompting a passenger to go to a filling station, it is acceptable for the controller 36 to notify a passenger that the amount of fuel reported as a refueling amount will result in a full tank. In this way, by telling a passenger to refuel to a full tank, the amount of oxygen inside the fuel tank 14 that can cause fuel to become oxidized can be reduced and an antioxidant contained in the fresh fuel can also suppress oxidation of the fuel.

By executing steps S42 and S56, the controller 36 notifies a passenger that the vehicle should be taken to a filling station when a number of days since a previous refueling exceeds a prescribed threshold number of days determined as a threshold for degradation of the fuel. However, the invention is not limited to such a condition for notification. For example, it is acceptable to issue a notification prompting the driver to go to a filling station when the amount of fuel remaining in the fuel tank 14 is smaller than a prescribed threshold value (e.g., the broken line in FIG. 10).

Figure 12:
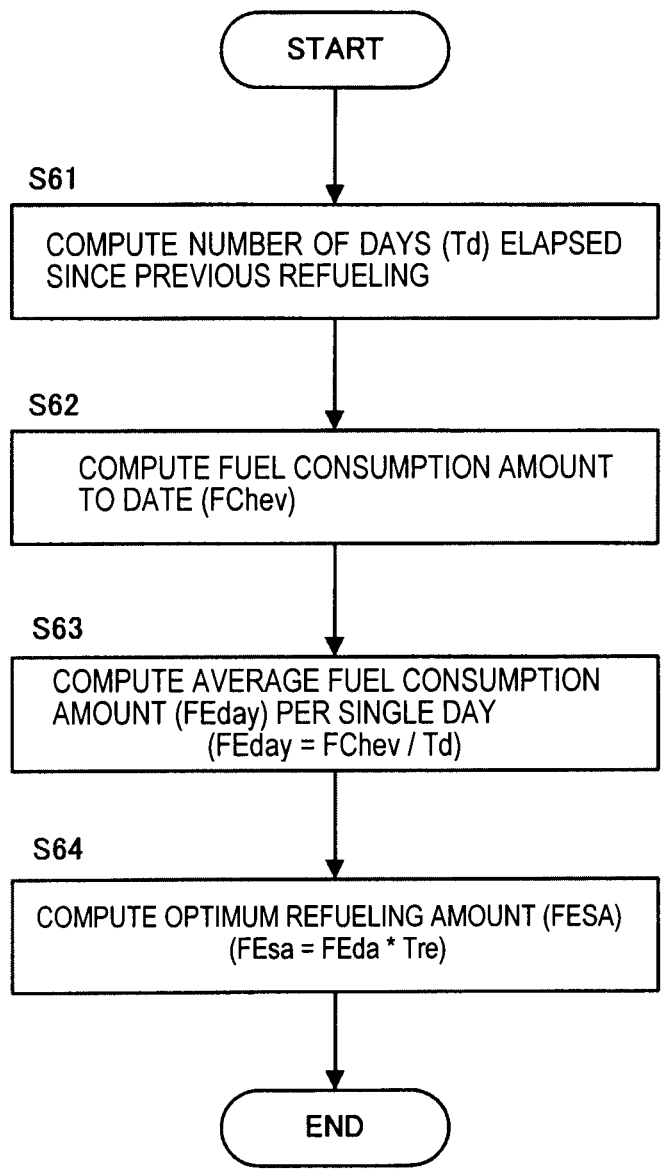
FIG. 12 is a flowchart showing a control logic used to compute an optimum refueling amount according to the illustrated embodiment.

FIG. 12 is a flowchart showing a control logic that is used to compute an optimum refueling amount according to the illustrated embodiment. A method of computing the optimum refueling amount shown in step S45 of FIG. 8 will now be explained in more detail.

In step S61, the controller 36 computes a number of days (Td) elapsed since the previous refueling (step S61). In step S62, the controller 36 computes an amount of fuel consumed (FChev) up to a current point in time (step S62). The number of days (Td) elapsed since the previous refueling and the amount of fuel consumed (FChev) are both found in step S36 of FIG. 7.

Afterwards, in step S63, the controller 36 computes an average fuel consumption amount (FEday in units of L/day) by dividing the amount of fuel consumed (FChev) to date computed in step S62 by the number of days elapsed (Td) computed in step S61.

Figure 13:
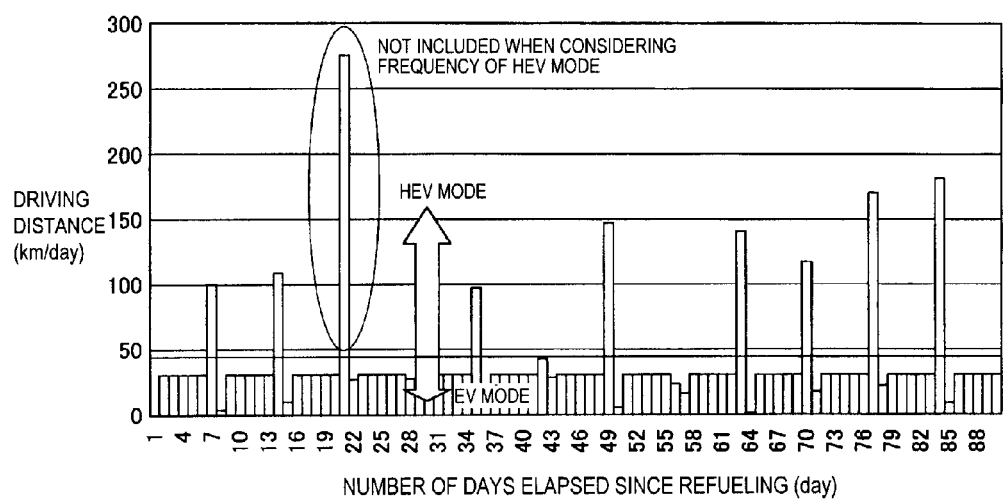
FIG. 13 is a chart for explaining a method of computing an average fuel consumption amount according to the illustrated embodiment.

FIG. 13 is a chart for explaining a method of computing an average fuel consumption amount according to the illustrated embodiment. FIG. 13 shows a relationship between a number of days elapsed since refueling (day) and a distance (km/day) driven in EV mode and HEV mode.

As shown in FIG. 13, there is a portion where an irregular history exists within the past usage history. For example, at 21 days after refueling, a distance driven in HEV mode is unusually large. If this irregular portion of the driving history is taken into account when computing an average fuel consumption amount in step S63, then a fuel consumption amount calculated based on the computed average fuel consumption amount will incur error.

Therefore, when the average fuel consumption amount (FEday) is computed in step S63, the controller 36 preferably eliminates the irregular portion of the driving history when it calculates the average fuel consumption amount (FEday). In this way, a more accurate average fuel consumption amount can be calculated and excess fuel that could become degraded in the fuel tank 14 can be prevented from being added to the fuel tank 14. Also, although the vertical axis indicates a distance driven per day in FIG. 13, it is also acceptable to indicate a distance driven per single trip.

Returning to FIG. 12, in step S64 the controller 36 computes an optimum refueling amount (FEsa) by multiplying the average fuel consumption amount (FEday) computed in step S63 by the aforementioned threshold number of days Tre (step S64). The optimum refueling amount (FEsa) is an amount of fuel required to enable the vehicle to travel using the average fuel consumption amount (FEday) every day for a number of days equal to the threshold number of days Tre after refueling.

By executing the processing just explained, the controller 36 can compute an optimum refueling amount (FEsa).

More particularly, the controller 36 computes the optimum refueling amount (FEsa) based on a past usage history (past fuel consumption amounts, see FIG. 12) of the electric powered vehicle 100. That is, based on the fuel consumption amount (FChev) found based on the past usage history of the vehicle, the controller 36 estimates an amount of fuel required for the vehicle to travel for a number of days (Tre) corresponding to when degradation will occur after refueling such that too much fuel is not added to the fuel tank when the vehicle is refueled. In this way, fuel can be consumed at a normal fuel efficiency before the fuel inside the fuel tank 14 starts to degrade.

Also, based on the optimum refueling amount (FEsa) required for the vehicle to travel for a number of days corresponding to when degradation will occur after refueling, which the controller 36 determines by executing a sequence of operations, the controller 36 follows the control flow shown in FIG. 8 to determine an amount of fuel to be added to the fuel tank 14. Thus, the fuel inside the fuel tank 14 can be used up before a day when the added fuel will start to degrade. As a result, the addition of excess fuel that could become degraded inside the fuel tank 14 can be prevented.

The controller 36 calculates an average fuel consumption amount per day (FEday) based on a number of days (Td) elapsed since a previous refueling and a fuel consumption amount (FChev) consumed while driving in HEV mode and calculates the optimum refueling amount (FEsa) based on the average fuel consumption amount per day (FEday) and a threshold number of days (Tre) corresponding to a number of days until fuel starts to degrade after refueling. As a result, the fuel inside the fuel tank 14 can be consumed before a day when the added fuel will start to degrade. As a result, the addition of excess fuel that could become degraded inside the fuel tank 14 can be prevented.

Figure 14:
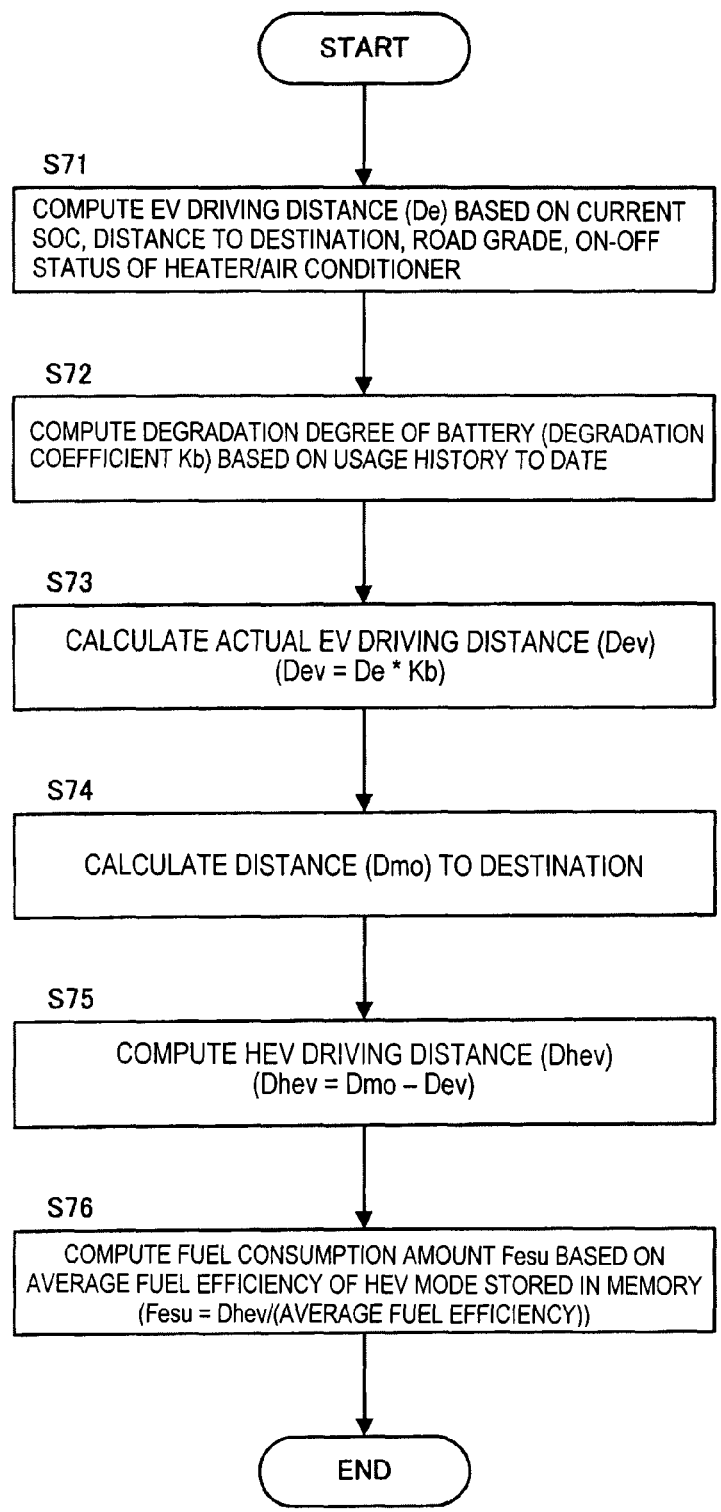
FIG. 14 is a flowchart showing a control logic that is executed for computing an anticipated fuel consumption amount according to the illustrated embodiment.

FIG. 14 is a flowchart showing a control logic that is used to compute an anticipated fuel consumption amount according to the illustrated embodiment. A method of computing the anticipated fuel consumption amount shown in step S49 of FIG. 8 will now be explained in more detail.

In step S71, the controller 36 computes a drivable distance (De in units of km) that can be driven in EV mode when the high-power battery 4 is not degraded based on a remaining capacity SOC of the high-power battery 4 at a current point in time, a distance to a destination, a grade of a road leading to the destination, and an on-off state of a heater/air conditioner.

In step S72, the controller 36 computes a degradation coefficient (Kb) indicating a degree of degradation of the high-power battery 4 based on usage history to date. The degradation coefficient Kb expresses a degree of decrease with respect to the drivable distance (De) attainable in EV mode when the high-power battery 4 is not degraded. The "usage history to date" mentioned in step S72 refers to a history of degradation over time determined based on an amount of electric power extracted from the high-power battery 4 and an amount of time over which electric power was extracted during past travel.

In step S73, the controller 36 calculates a drivable distance (Dev in units of km) that the vehicle can be driven in EV mode if degradation of the high-power battery 4 is taken into account by multiplying the drivable distance (De) calculated in step S71 by the degradation coefficient (Kb) calculated in step S72.

In the subsequent step S74, the controller 36 calculates a distance to a destination (Dmo in units of km) based on a destination set in the navigation controller 28.

In the subsequent step S75, the controller 36 computes a driving distance (Dhev in units of km) to be driven in HEV mode by subtracting the drivable distance (Dev) drivable in EV mode calculated in step S73 from the distance (Dmo) to a destination calculated in step S74.

In step S76, the controller 36 computes an anticipated fuel consumption amount (FEsu) by dividing the driving distance (Dhev in units of km) to be driven in HEV mode calculated in step S75 by the average fuel efficiency for HEV mode stored in the memory (step See the explanation of step S36 of FIG. 7, units of km/L).

By executing the processing just explained, the controller 36 can compute an anticipated fuel consumption amount (FEsu).

By executing a sequence of operations, the controller 36 calculates a drivable distance (Dev) that can be driven in EV mode using a degradation coefficient (Kb) indicating a degree of degradation of the high-power battery 4 and computes an anticipated fuel consumption amount (FEsu) based on a driving distance (Dhev) to be driven in HEV mode obtained by subtracting the drivable distance (Dev) that can be driven in EV mode from a distance (Dmo) to a destination. In this way, a more accurate driving distance (Dhev) for HEV mode can be estimated by using a distance (Dev) drivable in EV mode that takes into account a degradation state of the high-power battery 4. Furthermore, the anticipated fuel consumption amount (FEsu) can be calculated in a manner taking into account the estimated driving distance (Dhev). Consequently, a more accurate refueling amount can be reported, annoyances to a passenger can be reduced, and the addition of excess fuel that could become degraded inside the fuel tank 14 can be prevented.

In step S74, the controller 36 calculates the distance (Dmo) to a destination based on a destination set in the navigation controller 28, but the invention is not limited to such an arrangement. For example, it is acceptable to configure the vehicle such that a passenger is prompted to enter a planned driving distance via an input device of the navigation controller 28 and set the passenger's planned driving distance as the distance (Dmo) to a destination. In such a case, a refueling amount based on an accurate planned driving distance can be reported to a passenger by prompting the passenger to input the planned driving distance before the refueling amount is reported to the passenger.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
    a fuel tank;
    a fuel amount detecting device configured to detect an amount of fuel inside the fuel tank; and
    a control device configured to calculate an estimated refueling amount that diminishes fuel inside the fuel tank from degrading based on a usage history of the vehicle,
    the control device being further configured such that the control device stops refueling based on an amount of fuel detected by the fuel amount detecting device and the estimated refueling amount.

2. The vehicle as recited in claim 1, further comprising
    a filler tube communicating between the fuel tank and a refueling port; and
    an opening and closing device configured to open and close a passageway inside the filler tube,
    the control device being configured to stop refueling upon reaching the estimated refueling amount during refueling by closing the passageway inside the filler tube with the opening and closing device.

3. The vehicle as recited in claim 2, further comprising
    a notifying device configured to report prescribed information to a person conducting refueling of the vehicle,
    the control device employs the notifying means to issue information prompting the person conducting refueling of the vehicle to end refueling upon determining the amount of fuel within the fuel tank as detected by the fuel amount detecting device is within a prescribed amount of the estimated refueling amount.

4. The vehicle as recited in claim 2, further comprising
    an ignition switch configured to switch an electric power system of the vehicle between an operating state and a non-operating state; and
    a refueling operation detecting device configured to detect a commencement of a refueling operation,
    the control device being configured to start up upon the refueling operation detecting device detecting the commencement of the refueling operation.

5. The vehicle as recited in claim 1, further comprising
    a transmitting device configured to transmit information indicating the estimated refueling amount to a remotely located fuel dispensing machine that is located outside the vehicle,
    the control device being configured to transmit the information indicating the estimated refueling amount to the remotely located fuel dispensing machine through the transmitting device such that refueling is stopped upon the estimated refueling amount has been dispensed.

6. The vehicle as recited in claim 5, further comprising
    a notifying device configured to report prescribed information to a person conducting refueling of the vehicle,
    the control device employs the notifying means to issue information prompting the person conducting refueling of the vehicle to end refueling upon determining the amount of fuel within the fuel tank as detected by the fuel amount detecting device is within a prescribed amount of the estimated refueling amount.

7. The vehicle as recited in claim 5, further comprising
    an ignition switch configured to switch an electric power system of the vehicle between an operating state and a non-operating state; and
    a refueling operation detecting device configured to detect a commencement of a refueling operation,
    the control device being configured to start up upon the refueling operation detecting device detecting the commencement of the refueling operation.

8. The vehicle as recited in claim 1, further comprising
    a notifying device configured to report prescribed information to a person conducting refueling of the vehicle,
    the control device employs the notifying means to issue information prompting the person conducting refueling of the vehicle to end refueling upon determining the amount of fuel within the fuel tank as detected by the fuel amount detecting device is within a prescribed amount of the estimated refueling amount.

9. The vehicle as recited in claim 1, further comprising
    an ignition switch configured to switch an electric power system of the vehicle between an operating state and a non-operating state; and
    a refueling operation detecting device configured to detect a commencement of a refueling operation,
    the control device being configured to start up upon the refueling operation detecting device detecting the commencement of the refueling operation.

10. The vehicle as recited in claim 9, wherein
    the control device is configured to execute a self shutdown upon the control device determining that refueling has not commenced after a prescribed amount of time has elapsed since the control device started up.

11. The vehicle as recited in claim 10, further comprising
    a display device,
    the control device being configured to indicate the estimated refueling amount on the display device when the refueling operation detecting device has detected a refueling operation.

12. The vehicle as recited in claim 9, further comprising
a display device,
the control device being configured to indicate the estimated refueling amount on the display device when the refueling operation detecting device has detected a refueling operation.

13. The vehicle as recited in claim 1, further comprising
a fuel degradation detecting device configured to detect a degradation state of fuel inside the fuel tank,
the control device being configured to stop refueling when the fuel degradation detecting device has detected a degradation of fuel.

\* \* \* \* \*